United States Patent
Shi et al.

(10) Patent No.: US 10,168,846 B2
(45) Date of Patent: Jan. 1, 2019

(54) TOUCH DISPLAY PANEL, MANUFACTURING METHOD, DISPLAY DEVICE AND TOUCH SUBSTRATE

(71) Applicants: BOE Technology Group Co., Ltd., Beijing (CN); Hefei Xinsheng Optoelectronics Technology Co., Ltd., Hefei (CN)

(72) Inventors: Wenjie Shi, Beijing (CN); Taofeng Xie, Beijing (CN); Ming Hu, Beijing (CN); Tao Ma, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 97 days.

(21) Appl. No.: 15/306,963

(22) PCT Filed: Apr. 14, 2016

(86) PCT No.: PCT/CN2016/079273
§ 371 (c)(1),
(2) Date: Oct. 26, 2016

(87) PCT Pub. No.: WO2016/177264
PCT Pub. Date: Nov. 10, 2016

(65) Prior Publication Data
US 2018/0143707 A1    May 24, 2018

(30) Foreign Application Priority Data
May 4, 2015   (CN) .......................... 2015 1 0221125

(51) Int. Cl.
*G06F 3/044* (2006.01)
*G02B 5/08* (2006.01)

(52) U.S. Cl.
CPC ............ *G06F 3/044* (2013.01); *G02B 5/0816* (2013.01); *G06F 2203/04103* (2013.01); *G06F 2203/04107* (2013.01)

(58) Field of Classification Search
CPC ........ G06F 3/041; G06F 3/0412; G06F 3/044; G06F 2203/04103; G06F 2203/04107; G02B 5/0816
See application file for complete search history.

(56) References Cited

U.S. PATENT DOCUMENTS

| | | | |
|---|---|---|---|
| 8,853,554 B2 * | 10/2014 | Lin | G06F 3/042 174/255 |
| 2014/0062959 A1 * | 3/2014 | Ma | G06F 3/041 345/175 |

(Continued)

FOREIGN PATENT DOCUMENTS

| CN | 103049137 A | 4/2013 |
|---|---|---|
| CN | 203535587 U | 4/2014 |

(Continued)

OTHER PUBLICATIONS

Apr. 1, 2017—(CN) First Office Action Appn 201510221125.1 with English Tran.

(Continued)

*Primary Examiner* — Tom Sheng
(74) *Attorney, Agent, or Firm* — Banner & Witcoff, Ltd.

(57) ABSTRACT

A touch display panel, a manufacturing method, a display device and a touch substrate are provided. The touch display panel, comprising a display region and a non-display region surrounding the display region; the display region includes a base substrate and a touch function layer arranged on the base substrate; the non-display region includes the base substrate, and a white light-shielding layer and a reflection enhancing layer which are sequentially arranged on the base substrate, and the reflection enhancing layer is configured (Continued)

for increasing reflectivity of the touch display panel with respect to incident rays; the touch function layer, the white light-shielding layer and the reflection enhancing layer are located on a same side of the base substrate. The touch display panel can improve brightness of appearance of a white OGS touch screen.

20 Claims, 4 Drawing Sheets

(56) References Cited

U.S. PATENT DOCUMENTS

| | | | |
|---|---|---|---|
| 2014/0184951 A1 | 7/2014 | Yeh et al. | |
| 2014/0368757 A1* | 12/2014 | Chen | H03K 17/9622 349/12 |
| 2015/0185903 A1* | 7/2015 | Park | G06F 3/044 345/173 |
| 2015/0220191 A1* | 8/2015 | Huh | G06F 3/044 345/173 |
| 2016/0342239 A1* | 11/2016 | Xie | G06F 3/044 |

FOREIGN PATENT DOCUMENTS

| | | |
|---|---|---|
| CN | 203673463 U | 6/2014 |
| CN | 104331201 A | 2/2015 |
| CN | 204178342 U | 2/2015 |
| CN | 104765505 A | 7/2015 |

OTHER PUBLICATIONS

Dec. 5, 2017—(CN) Office Action application 201510221125.1 with English Translation.

Jul. 11, 2016—(WO)—International Search Report and Written Opinion Appl PCT/CN2016/079273 with English Tran.

* cited by examiner

TOUCH DISPLAY PANEL, MANUFACTURING METHOD, DISPLAY DEVICE AND TOUCH SUBSTRATE

The application is a U.S. National Phase Entry of International Application No. PCT/CN2016/079273 filed on Apr. 14, 2016, designating the United States of America and claiming priority to Chinese Patent Application No. 201510221125.1, filed May 4, 2015. The present application claims priority to and the benefit of the above-identified applications and the above-identified applications are incorporated by reference herein in their entirety.

TECHNICAL FIELD

Embodiments of the present disclosure relate to a touch display panel, a manufacturing method, a display device and a touch substrate.

BACKGROUND

In recent years, touch technologies are widely applied in various kinds of multimedia electronic products, in particular portable electronic products, such as mobile phones, electronic books, tablet personal computers and the like. A touch technology as an input means can effectively replace a keyboard or a mouse; besides the advantage of convenience, the touch technology also has operation intuitiveness, and therefore the touch input manner has also become a popular human-computer interaction interface and multimedia interactive manner.

Capacitive touch display screens belong to a new generation of touch display screens appearing in the market after resistive touch display screens, and there has been a qualitative leap in performance of this new generation of market-oriented touch display screens compared with the previous generation of products, which not only makes sensitive response, but also supports multi-point touch operation, such that playability and operability of touch products are greatly improved. A current type of capacitive touch display screen mainly comprises a GLASS-GLASS (GG) type touch display screen or a One-Glass-Solution (OGS) type touch display screen. The GG type touch display screen needs two attachment processes in manufacturing, and therefore the yield in attachment is generally low, while the technology that an ITO conductive film and a sensor are directly formed on a single protective glass plate is adopted for an OGS type touch display screen, to make one sheet of glass have dual functions of protective glass and touch sensor. Thus, compared with a GG touch technology, an OGS type touch display screen technology is simple in structure and has advantages of being light, thin, good in light transmission performance and the like, and because one sheet of glass substrate and one attachment procedure are omitted, production costs is reduced, and production yield is increased. Thus, the OGS technology gradually becomes a leading technology direction of a touch industry.

The OGS type touch display screens mainly divided into white OGS type touch display screens and black OGS type touch display screens. A material of a white light-shielding layer of the white OGS type touch display screen is mainly nanometer titanium dioxide (chemical formula: $TiO_2$), that is to say, the whiteness of appearance of the white OGS type touch display screen is increased with the help of very small nanometer $TiO_2$ particles, such that the appearance of the white OGS type touch display screen becomes white.

SUMMARY

Embodiments of the present disclosure provide a touch display panel, a manufacturing method, a display device and a touch substrate, to relieve a fact that because an OD value of a white light-shielding layer of a white OGS type touch display screen is low, brightness of appearance of the white OGS type touch display screen is small.

In a first aspect, at least one embodiment of the present disclosure provides a touch display panel, comprising a display region and a non-display region surrounding the display region; the display region includes a base substrate and a touch function layer arranged on the base substrate; the non-display region includes the base substrate, and a white light-shielding layer and a reflection enhancing layer which are sequentially arranged on the base substrate, and the reflection enhancing layer is configured for increasing reflectivity of the touch display panel with respect to incident rays; the touch function layer, the white light-shielding layer and the reflection enhancing layer are located on a same side of the base substrate.

For example, the reflection enhancing layer includes a first layer structure arranged on the base substrate and a second layer structure arranged on a side of the first layer structure away from the base substrate, and a reflective index of the first layer structure is greater than that of the second layer structure.

For example, the reflection enhancing layer includes: a first layer structure formed of niobium pentoxide and a second layer structure located on the first layer structure and formed of silicon dioxide.

For example, a reflective index of the reflection enhancing layer is 1.6-2.5.

For example, the reflection enhancing layer is a silicon oxynitride layer.

For example, the touch display panel may further comprise a black light-shielding layer, wherein the black light-shielding layer is arranged on the reflection enhancing layer.

For example, a material of the black light-shielding layer is a black photoresist material.

For example, a material of the white light-shielding layer is a white photoresist material.

For example, a material of the black light-shielding layer is black ink.

For example, a material of the white light-shielding layer is white ink.

For example, a material of the white light-shielding layer is a white photoresist material or white ink.

In a second aspect, at least one embodiment of the present disclosure provides a manufacturing method of a touch display panel, comprising: forming a white light-shielding layer on a base substrate, wherein the white light-shielding layer is located in a non-display region of the touch display panel; forming a reflection enhancing layer on the white light-shielding layer, wherein the reflection enhancing layer is configured for increasing reflectivity of the touch display panel with respect to incident rays; and forming a touch function layer on the base substrate by a patterning process, wherein the touch function layer is located in a display region of the touch display panel, wherein the touch function layer, the white light-shielding layer and the reflection enhancing layer are located on a same side of the base substrate.

For example, the non-display region surrounds the display region.

For example, forming the reflection enhancing layer includes: forming a first structure layer with niobium pentoxide on the base substrate where the white light-shielding layer is formed; and forming a second structure layer with silicon dioxide on the base substrate where the first structure layer is formed.

For example, before forming the touch function layer, the method further comprises: forming a black light-shielding layer on the base substrate where the reflection enhancing layer is formed.

For example, a layer of black photoresist material is formed on the base substrate where the reflection enhancing layer is formed, and the black light-shielding layer is formed by a photolithography process.

For example, a layer of white photoresist material is formed on the base substrate, and the white light-shielding layer is formed by a photolithography process.

For example, black ink is printed on the base substrate where the reflection enhancing layer is formed by a screen printing process so as to form the black light-shielding layer.

For example, white ink is printed on the base substrate by a screen printing process so as to form the white light-shielding layer.

For example, a layer of white photoresist material is formed on the base substrate, and the white light-shielding layer is formed by a photolithography process; or white ink is printed on the base substrate by a screen printing process so as to form the white light-shielding layer.

In a third aspect, at least one embodiment of the present disclosure provides a display device comprising any one of the touch display panels.

In a fourth aspect, at least one embodiment of the present disclosure provides a touch substrate, comprising a touch region and a non-touch region surrounding the touch region, wherein the touch region includes a base substrate and a touch function layer arranged on the base substrate; the non-touch region includes a base substrate, and a white light-shielding layer and a reflection enhancing layer which are sequentially arranged on the base substrate, and the reflection enhancing layer is configured for increasing reflectivity of a touch display panel on an incident ray; and the touch function layer, the white light-shielding layer and the reflection enhancing layer are located on a same side of the base substrate.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

"Upper" and "lower" or the like in embodiments of the present disclosure adopts a sequence of manufacturing an array substrate as the criterion, for example, an upper pattern refers to a pattern formed later relatively, and a lower pattern refers to a pattern formed first relatively.

In research, the inventors of the present disclosure notices that regarding a white OGS touch display screen, because nanometer $TiO_2$ particles are too small, incident rays cannot be effectively reflected and absorbed, the Optical Density (OD) value of a white light-shielding layer is low, and consequently the brightness of appearance of the white OGS touch screen is small.

What needs to be explained first is that, a white light-shielding layer, a reflection enhancing layer and a touch function layer in an embodiment of the present disclosure are referred to according to the main functions of various kinds of material layers in a touch display panel. Thus, a "layer" herein can refer to a layer of thin film manufactured with a certain kind of material on a substrate by a deposition process and the like, and can also refer to functional layers which are formed on the substrate respectively with various kinds of materials by a patterning process and achieve certain functions.

Figure 1:
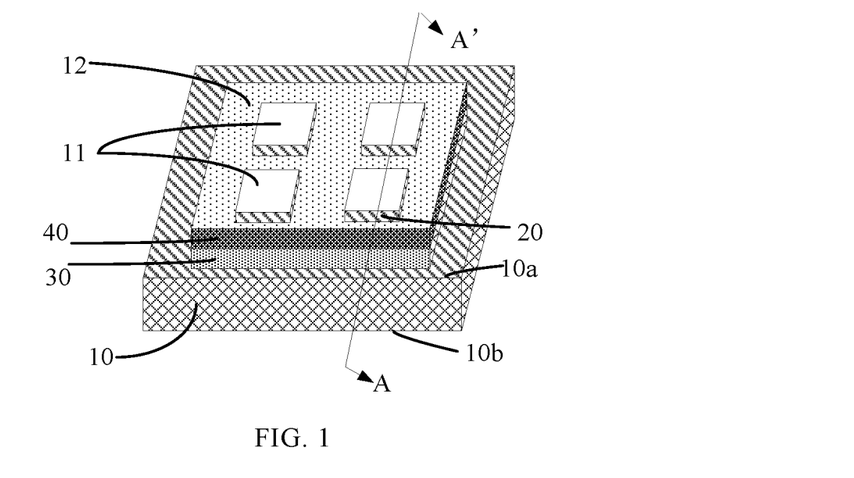
FIG. 1 is a schematic structural diagram of a touch display panel provided by an embodiment of the present disclosure.
Figure 2A:
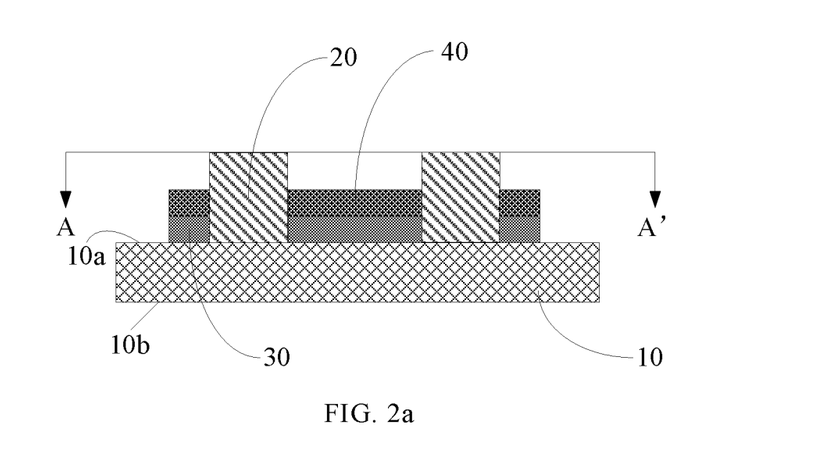
FIG. 2a is a sectional diagram of the touch display panel provided by the embodiment of the present disclosure as shown in FIG. 1 along an A-A' vertical cross-section.

At least one embodiment of the present disclosure provides a touch display panel, for example, referring to FIG. 1 and FIG. 2a; here FIG. 2a is a sectional diagram along an A-A' vertical cross-section of FIG. 1, and the touch display panel comprises a display region 11 and a non-display region 12 surrounding the display region.

The display region 11 includes a base substrate 10 and a touch function layer 20 arranged on the base substrate 10.

The non-display region 12 includes a base substrate 10, and a white light-shielding layer 30 and a reflection enhancing layer 40 which are sequentially arranged on the base substrate 10. That is to say, as shown in FIG. 1 and FIG. 2a, the base substrate 10 has a first surface 10a and a second surface 10b opposite to each other, the first surface 10a is configured for bearing the white light-shielding layer 30 and the reflection enhancing layer 40, and the white light-shielding layer 30 and the reflection enhancing layer 40 are sequentially arranged in a direction perpendicular to the first surface 10*a*. The reflection enhancing layer 40 is configured for increasing reflectivity of the touch display panel with respect to incident rays.

The touch function layer 20, the white light-shielding layer 30 and the reflection enhancing layer 40 are located on a same side of the base substrate 10. That is to say, the touch function layer 20, the white light-shielding layer 30 and the reflection enhancing layer 40 are arranged on the side of the first surface 10*a* away from the second surface 10*b*.

For example, the material of the white light-shielding layer 30 can comprise nanometer titanium dioxide. Of course, the material of the white light-shielding layer 30 comprises, but is not limited to this example.

Figure 2B:
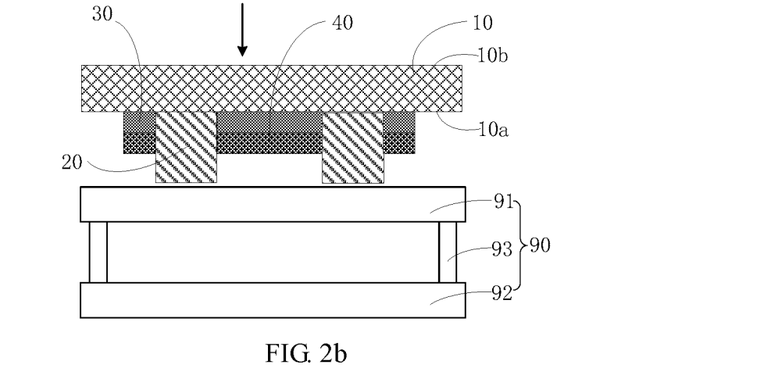
FIG. 2b is a schematic structural diagram of the touch display panel provided by the embodiment of the present disclosure irradiated by incident rays.

For example, the touch display panel provided by the embodiment of the present disclosure can be an On Glass Solution (OGS) type touch display panel. For example, as shown in FIG. 2*b*, the touch display panel comprises a display panel 90, and the touch function layer 20, the white light-shielding layer 30 and the reflection enhancing layer 40 are arranged between the base substrate 10 and the display panel 90. For example, the display panel 90 can include a first substrate 91 and a second substrate 92 opposite to each other, and a connecting part 93 connecting the two substrates. Of course, the structure of the display panel 90 comprises, but not limited to, the configuration as shown in FIG. 2*b*. For example, the display panel 90 can be a liquid crystal display panel, an OLED panel or a quantum dot light-emitting panel or the like.

In a case that the touch display panel is the OGS type touch display panel, for example, as shown in FIG. 2*b*, an incident ray (indicated with the arrow in FIG. 2*b*; of course, the incident ray can also be tilted at a certain angle) is incident onto the touch display panel from the second surface 10*b* of the base substrate 10. Of course, the touch display panel provided by the embodiment of the present disclosure comprises, but not limited to, the OGS type touch display panel.

The touch display panel provided by the above embodiment comprises the display region and the non-display region surrounding the display region, the display region includes the base substrate and the touch function layer arranged on the base substrate; the non-display region includes the base substrate, and the white light-shielding layer and the reflection enhancing layer which are sequentially arranged on the base substrate, and the reflection enhancing layer can increase the reflectivity of the touch display panel with respect to the incident ray, and the touch function layer, the white light-shielding layer and the reflection enhancing layer are located on the same side of the base substrate. Thus, the touch display panel provided by the embodiment of the present disclosure can increase reflectivity of the incident ray after transmitting the white light-shielding layer, for example, compared with a touch display panel not provided with the reflection enhancing layer, the embodiment of the present disclosure can increase reflectivity of a region where the white light-shielding layer of the touch display panel is located by 5%-10%. By increasing the reflectivity, the transmittance of the white light-shielding layer on light ray can be reduced, so that the OD value thereof can be increased. On the other hand, by increasing the reflectivity of the touch display panel with respect to the incident ray, the brightness of the touch display panel can also be increased.

For example, the reflection enhancing layer 40 can comprise a first layer structure arranged on the base substrate and a second layer structure arranged on a side of the first layer structure away from the base substrate, and a reflective index of the first layer structure is greater than that of the second layer structure. In this way, when the incident ray irradiating onto the touch display panel enters the second layer structure of a lower reflective index from the first layer structure of a higher reflective index, the reflection enhancing layer can play a role of increasing the reflectivity of the touch display panel with respect to the incident ray.

Figure 2C:
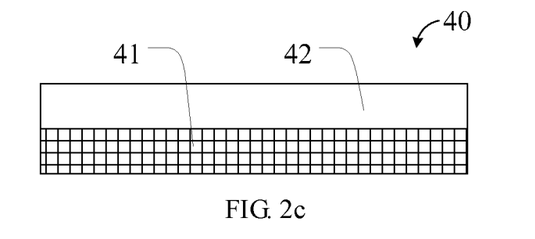
FIG. 2c is a schematic structural diagram of a reflection enhancing layer in the touch display panel provided by the embodiment of the present disclosure comprising a first layer structure and a second layer structure.

For example, as shown in FIG. 2*c*, the reflection enhancing layer 40 can comprise: the first layer structure 41 formed of niobium pentoxide (chemical formula: $Nb_2O_5$) and the second layer structure 42 located on the first layer structure 41 and formed of silicon dioxide (chemical formula: $SiO_2$). That is to say, the reflection enhancing layer 40 can adopt a $Nb_2O_5+SiO_2$ film system.

Of course, the reflection enhancing layer 40 can be a single-layer film of a high reflective index, for example, the reflective index of the single-layer film can be from 1.6 to 2.5. For example, the reflection enhancing layer can be a silicon oxynitride layer. Of course, the example when the reflection enhancing layer is the single-layer film comprises, but not limited to, the silicon oxynitride layer.

Figure 3:
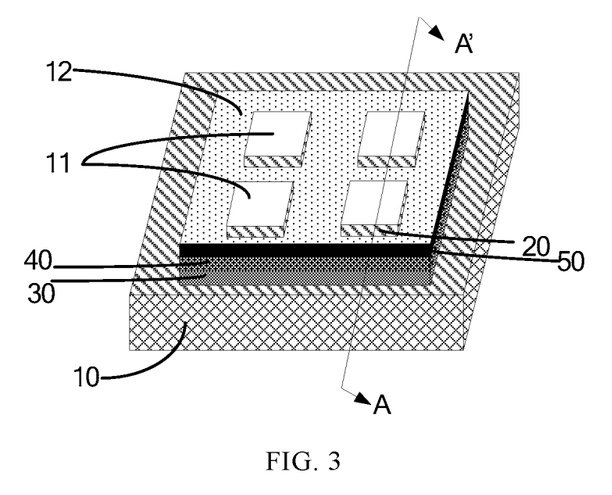
FIG. 3 is a schematic structural diagram of another touch display panel provided by the embodiment of the present disclosure.
Figure 4:
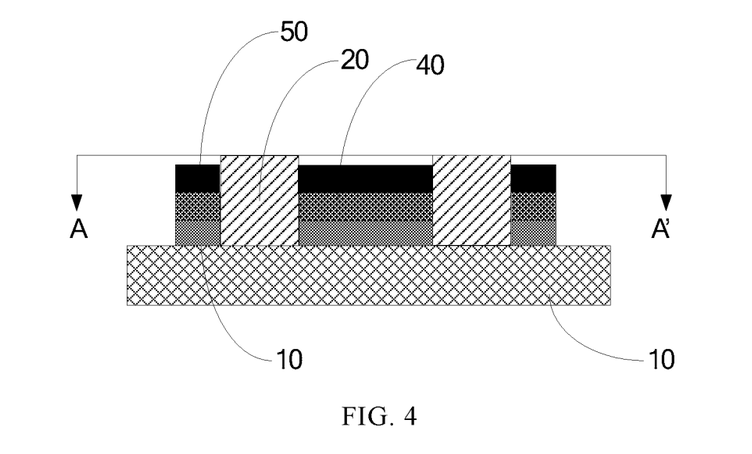
FIG. 4 is a sectional diagram of the touch display panel provided by the embodiment of the present disclosure as shown in FIG. 3 along an A-A' vertical cross-section.

Furthermore, referring to FIGS. 3 and 4, wherein FIG. 4 is a sectional diagram along an A-A' vertical cross-section of FIG. 3, for example, the touch display panel can further comprise a black light-shielding layer 50 which is arranged on the reflection enhancing layer 40.

The black light-shielding layer 50 is arranged on the reflection enhancing layer 40, which can increase the capability of the touch display panel to absorb light rays, and thus can further increase the optical density value of the touch display panel.

For example, the material of the white light-shielding layer 30 can be a white photoresist material. For example, the material of the black light-shielding layer 40 can be a black photoresist material.

For example, the material of the white light-shielding layer 30 can be a white ink material. For example, the material of the black light-shielding layer 40 can be a black ink material.

Figure 5:
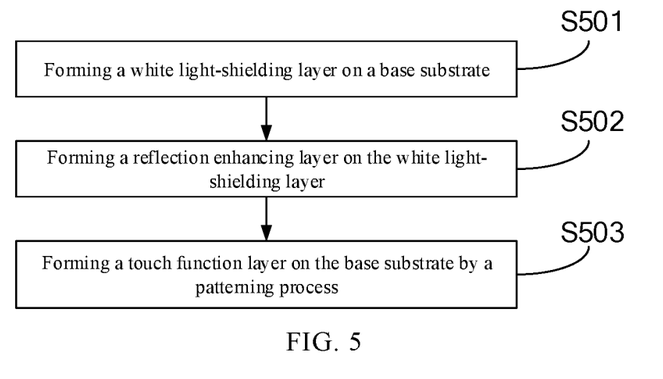
FIG. 5 is a process flow diagram of a manufacturing method of the touch display panel provided by the embodiment of the present disclosure.

An embodiment of the present disclosure provides a manufacturing method of a touch display panel, used for manufacturing the touch display panel provided by the above embodiment, and referring to FIG. 5, the method comprises steps S501 to S503 as follows.

Step S501: forming a white light-shielding layer on a base substrate, wherein the white light-shielding layer is located in a non-display region of the touch display panel.

Step S502: forming a reflection enhancing layer on the white light-shielding layer.

Step S503: forming a touch function layer on the base substrate by a patterning process, wherein the touch function layer is located in a display region of the touch display panel, and the touch function layer, the white light-shielding layer and the reflection enhancing layer are located on a same side of the base substrate.

For example, the non-display region of the touch display panel can surround the display region of the touch display panel.

For example, the touch function layer can comprise a touch electrode layer (for example an Indium Tin Oxide (ITO) electrode layer, and of course, an electrode layer made from another material can also be adopted), a conducting wire layer and an insulating layer, a plurality of wires in the conducting wire layer are respectively connected with a plurality of touch electrodes in the touch electrode layer; the layer structure of the touch function layer is not specifically limited herein, and the touch function layer can be adopted as long as a touch function can be achieved. For example, the patterning process can comprise substrate cleaning, film forming, photoresist coating, exposing, developing, etching, photoresist stripping and other procedures; for example, a metal layer can be formed by using a physical vapor deposition method (such as a magnetron sputtering method). For example, the metal layer can be patterned by, for example, wet etching. For example, a nonmetal layer can be formed by using a physical vapor deposition method (such as a magnetron sputtering method). For example, the non-metal layer can be patterned by dry etching. Of course, forming manners of the metal layer and the non-metal layer comprise, but not limited to, the manners enumerated above.

The embodiment of the present disclosure provides the manufacturing method of the touch display panel, the touch function layer is manufactured in the display region on the base substrate, the white light-shielding layer and the reflection enhancing layer on the base substrate are manufactured in the non-display region, and the reflection enhancing layer is configured for increasing reflectivity of the touch display panel with respect to the incident rays; and the touch function layer, the white light-shielding layer and the reflection enhancing layer are located on the same side of the base substrate. The touch display panel manufactured by the manufacturing method of the touch display panel provided by the embodiment of the present disclosure can increase reflectivity of the incident rays after transmitting the white light-shielding layer, and thus can reduce the transmittance of the white light-shielding layer with respect to light rays, so that the OD value can be increased; and on the other hand, by increasing the reflectivity of the touch display panel with respect to the incident rays, the brightness of the touch display panel can also be increased.

Figure 6:
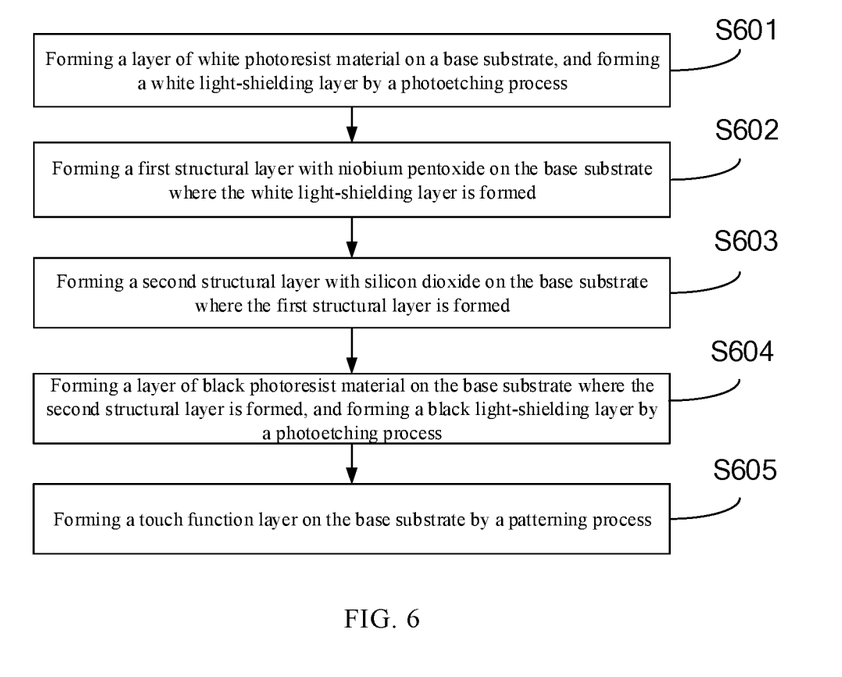
FIG. 6 is a process flow diagram of a manufacturing method of another touch display panel provided by the embodiment of the present disclosure.

For example, an embodiment of the present disclosure provides a manufacturing method of a touch display panel, and referring to FIG. 6, the method can comprise steps from S601 to S603.

Step S601: forming a layer of white photoresist material on a base substrate, and forming a white light-shielding layer by a photolithography process.

The photolithography process is one kind of patterning processes, for example can comprise: preprocessing, base film forming, photoresist coating, baking, exposing, developing, etching and other steps. For example, the preprocessing commonly includes: wet cleaning, deionized water cleaning, dewatering baking and other steps; for example, the base film forming can be achieved by using vapor deposition, magnetron sputtering and other methods; for example, the photoresist coating can be achieved through static adhesive coating or dynamic adhesive coating; the baking can be used for removing a solvent in photoresist or a solvent after the developing. Besides, the photolithography process can also comprise: hardening baking, developing inspection and other steps. Steps in the photolithography process which are used when a white photoresist layer and a black photoresist layer are formed and the number of times of using the steps are not limited in the description, as long as the white photoresist layer and the black photoresist layer can be formed. For example, the photolithography process can also comprise several of the above steps, for example the photolithography process comprises photoresist coating, the exposing, developing and other steps.

Step S602: forming a first structure layer with niobium pentoxide on the base substrate where the white light-shielding layer is formed.

Step S603: forming a second structure layer with silicon dioxide on the base substrate where the first structure layer is formed.

For example, the first structure layer formed of niobium pentoxide on the white light-shielding layer and the second structure layer formed of silicon dioxide on the base substrate where the first structure layer is formed can both be prepared in a magnetron sputtering manner.

For example, as shown in FIG. 6, the manufacturing method of the touch display panel provided by the embodiment of the present disclosure can also comprise a step S604: forming a layer of black photoresist material on the base substrate where the second structure layer is formed, and forming a black light-shielding layer by a photolithography process.

The black light-shielding layer is arranged on the reflection enhancing layer, which can increase the capability of the touch display panel absorbing light rays, and thus can further increase the optical density value of the touch display panel.

As shown in FIG. 6, after the above step S603 or step S604 is completed, a step S605 can be performed: forming a touch function layer on the base substrate by a patterning process, and the touch function layer is made to be located in a display region of the touch display panel.

Figure 7:
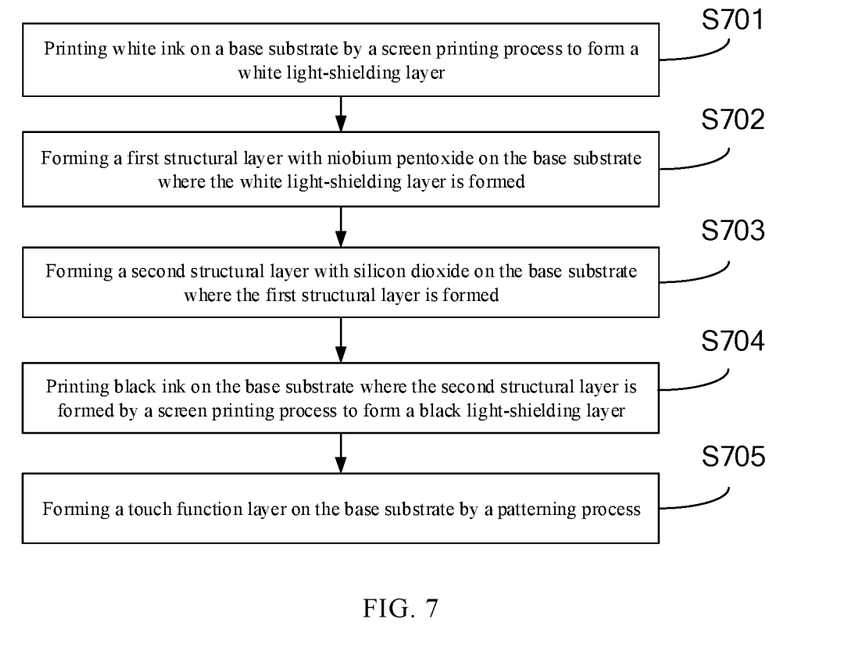
FIG. 7 is a process flow diagram of a manufacturing method of still another touch display panel provided by an embodiment of the present disclosure.

For example, an embodiment of the present disclosure provides a manufacturing method of a touch display panel, referring to FIG. 7, the method can comprise steps from S701 to S704 as follows.

Step S701: printing white ink on a base substrate by a screen printing process to form a white light-shielding layer, wherein a white ink layer is located in a non-display region of the touch display panel.

The screen printing process is also called a silk-screen printing process, the main steps in the silk-screen printing process include manufacturing of a screen plate, generally, the process of manufacturing of the screen plate comprises: stretching, degreasing, drying, film coating, substrate stripping, exposing, developing, color-separation drafting or the like. After the screen plate is manufactured and obtained, the white ink layer and a black ink layer in subsequent steps can be printed by means of a scraper blade, ink and the like.

Step S702: forming a first structure layer with niobium pentoxide on the base substrate where the white light-shielding layer is formed.

Step S703: forming a second structure layer with silicon dioxide on the base substrate where the first structure layer is formed.

For example, the first structure layer formed of niobium pentoxide on the white light-shielding layer and the second structure layer formed of silicon dioxide on the base substrate where the first structure layer is formed can both be prepared in a magnetron sputtering manner.

For example, the manufacturing method of the touch display panel provided by the embodiment of the present disclosure can also comprise a step S704: printing black ink on the base substrate where the second structure layer is formed by a screen printing process to form a black light-shielding layer.

The black light-shielding layer is arranged on the reflection enhancing layer, which can increase the capability of the touch display panel absorbing light rays, and thus can further increase the optical density value of the touch display panel.

After the step S703 or the step S704 is completed, a step S705 can be performed: forming a touch function layer on the base substrate by a patterning process, and the touch function layer is made to be located in a display region of the touch display panel.

An embodiment of the present disclosure further provides a display device, the display device comprises any touch display panel described above, and the touch display panel can be obtained by using the manufacturing method of the touch display panel provided by the embodiment of the present disclosure. For example, the display device can be a liquid crystal display, a liquid crystal display TV set, a digital camera, a mobile phone, a tablet personal computer or any product or part having a display function.

Figure 8:
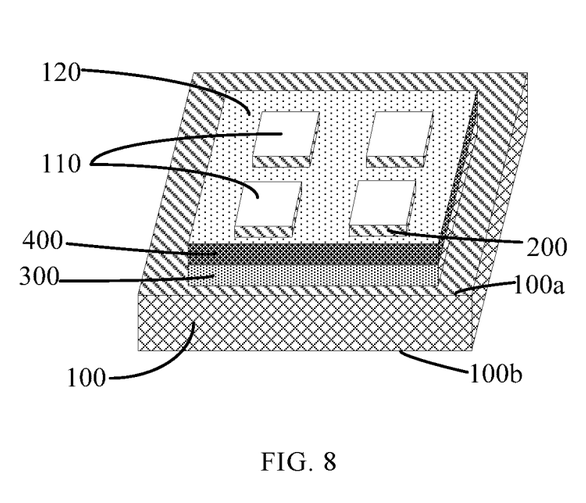
FIG. 8 is a schematic structural diagram of a touch substrate provided by an embodiment of the present disclosure.

At least one embodiment of the present disclosure provides a touch substrate, as shown in FIG. 8, the touch substrate comprises a touch region 110 and a non-touch region 120 surrounding the touch region 110. The touch region 110 includes a base substrate 100 and a touch function layer 200 arranged on the base substrate 100; the non-touch region 120 includes a base substrate 100, and a white light-shielding layer 300 and a reflection enhancing layer 400 which are sequentially arranged on the base substrate 100. That is to say, as shown in FIG. 8, the base substrate 100 has a first surface 100a and a second surface 100b opposite to each other, the first surface 100a is configured for bearing the white light-shielding layer 300 and the reflection enhancing layer 400, and the white light-shielding layer 300 and the reflection enhancing layer 400 are sequentially arranged in a direction perpendicular to the first surface 100a. The reflection enhancing layer 400 is configured for increasing reflectivity of the touch substrate with respect to incident rays. The touch function layer 200, the white light-shielding layer 300 and the reflection enhancing layer 400 are located on a same side of the base substrate 100. That is to say, the touch function layer 200, the white light-shielding layer 300 and the reflection enhancing layer 400 are arranged on a side of the first surface 100a away from the second surface 100b.

For example, the reflection enhancing layer 400 can comprise a first layer structure formed of niobium pentoxide and a second layer structure formed of silicon dioxide. Of course, the first layer structure and the second layer structure in the refection enhancing layer can also adopt other materials, as long as the reflective index of the first layer structure close to the base substrate is greater than that of the second layer structure away from the base substrate.

For example, the reflection enhancing layer 400 can also adopt a single-layer film, and a reflective index of the single-layer film is, for example, 1.6-2.5. For example, the reflection enhancing layer 400 can be a silicon oxynitride layer.

For example, a material of the white light-shielding layer 300 can comprise nanometer titanium dioxide. Of course, the implementation of the white light-shielding layer 300 comprises, but not limited to, nanometer titanium dioxide.

Implementation modes of the touch display panel and the manufacturing method thereof, and various structures in the display device and the touch substrate provided by embodiments of the present disclosure can refer to each other.

In the touch display panel and the manufacturing method thereof, the display device comprising the touch display panel and the touch substrate provided by the embodiments of the present disclosure, the touch display panel comprises the display region and the non-display region surrounding the display region, the display region includes the base substrate and the touch function layer arranged on the base substrate; the non-display region includes the base substrate, and the white light-shielding layer and the reflection enhancing layer which are sequentially arranged on the base substrate, and the reflection enhancing layer can increase the reflectivity of the touch display panel with respect to the incident ray, and the touch function layer, the white light-shielding layer and the reflection enhancing layer are located on the same side of the base substrate. Thus, the touch display panel provided by the embodiment of the present disclosure can increase the reflectivity of the incident ray after transmitting the white light-shielding layer and thus can reduce the transmittance of the white light-shielding layer with respect to light rays, so that the OD value can be increased; on the other hand, by increasing the reflectivity of the touch display panel with respect to the incident ray, the brightness of the touch display panel can also be increased.

What are described above is related to the illustrative embodiments of the disclosure only and not limitative to the scope of the disclosure; the scopes of the disclosure are defined by the accompanying claims.

The application claims priority to the Chinese patent application No. 201510221125.1, filed May 4, 2015, the entire disclosure of which is incorporated herein by reference as part of the present application.

What is claimed is:

1. A touch display panel, comprising:
   a display region and
   a non-display region surrounding the display region, wherein
   the display region comprises a base substrate and a touch function layer arranged on the base substrate;
   the non-display region comprises the base substrate, and a white light-shielding layer and a reflection enhancing layer which are sequentially arranged on the base substrate, and the reflection enhancing layer is configured for increasing reflectivity of the touch display panel with respect to incident rays; and
   the touch function layer, the white light-shielding layer and the reflection enhancing layer are located on a same side of the base substrate.

2. The touch display panel according to claim 1, wherein the reflection enhancing layer comprises a first layer structure arranged on the base substrate and a second layer structure arranged on a side of the first layer structure away from the base substrate, and a reflective index of the first layer structure is greater than a reflective index of the second layer structure.

3. The touch display panel according to claim 1, wherein the reflection enhancing layer comprises:
   a first layer structure formed of niobium pentoxide, and
   a second layer structure located on the first layer structure and formed of silicon dioxide.

4. The touch display panel according to claim 1, wherein a reflective index of the reflection enhancing layer is 1.6 - 2.5.

5. The touch display panel according to claim 4, wherein the reflection enhancing layer is a silicon oxynitride layer.

6. The touch display panel according to claim 1, further comprising a black light-shielding layer, wherein the black light-shielding layer is arranged on the reflection enhancing layer.

7. The touch display panel according to claim 6, wherein a material of the black light-shielding layer is a black photoresist material.

8. The touch display panel according to claim 7, wherein a material of the white light-shielding layer is a white photoresist material.

9. The touch display panel according to claim 6, wherein a material of the black light-shielding layer is black ink.

10. The touch display panel according to claim 9, wherein a material of the white light-shielding layer is white ink.

11. The touch display panel according to claim 1, wherein a material of the white light-shielding layer is a white photoresist material or white ink.

12. A display device, comprising the touch display panel according to claim 1.

13. A manufacturing method of a touch display panel, comprising:
   forming a white light-shielding layer on a base substrate, wherein the white light-shielding layer is located in a non-display region of the touch display panel;
   forming a reflection enhancing layer on the white light-shielding layer, wherein the reflection enhancing layer is configured for increasing reflectivity of the touch display panel with respect to incident rays; and
   forming a touch function layer on the base substrate by a patterning process, wherein the touch function layer is located in a display region of the touch display panel,
   wherein the touch function layer, the white light-shielding layer and the reflection enhancing layer are located on a same side of the base substrate.

14. The method according to claim 13, wherein the non-display region surrounds the display region.

15. The method according to claim 13, wherein forming the reflection enhancing layer comprises:
   forming a first structure layer with niobium pentoxide on the base substrate where the white light-shielding layer is formed; and
   forming a second structure layer with silicon dioxide on the base substrate where the first structure layer is formed.

16. The method according to claim 13, wherein, before forming the touch function layer, the method further comprises:
   forming a black light-shielding layer on the base substrate where the reflection enhancing layer is formed.

17. The method according to claim 16, wherein a layer of black photoresist material is formed on the base substrate where the reflection enhancing layer is formed, and the black light-shielding layer is formed by a photolithography process.

18. The method according to claim 13, wherein a layer of white photoresist material is formed on the base substrate, and the white light-shielding layer is formed by a photolithography process.

19. The method according to claim 13, wherein a layer of white photoresist material is formed on the base substrate, and the white light-shielding layer is formed by a photolithography process; or
   white ink is printed on the base substrate by a screen printing process so as to form the white light-shielding layer.

20. A touch substrate, comprising:
   a touch region and
   a non-touch region surrounding the touch region, wherein
   the touch region comprises a base substrate and a touch function layer arranged on the base substrate;
   the non-touch region comprises a base substrate, and a white light-shielding layer and a reflection enhancing layer which are sequentially arranged on the base substrate, and the reflection enhancing layer is configured for increasing reflectivity of a touch display panel on an incident ray; and
   the touch function layer, the white light-shielding layer and the reflection enhancing layer are located on a same side of the base substrate.

* * * * *